United States Patent [19]

Imazeki et al.

[11] Patent Number: 4,483,593

[45] Date of Patent: Nov. 20, 1984

[54] GUEST-HOST TYPE LIQUID CRYSTAL COMPOSITION AND LIQUID CRYSTAL DISPLAY DEVICE

[75] Inventors: Shuji Imazeki, Hitachi; Akio Mukoh, Mito; Mikio Sato, Hitachi; Seiichi Imahori, Kawasaki; Masaharu Kaneko, Yamato; Tetsuo Ozawa, Tokyo, all of Japan

[73] Assignees: Hitachi, Ltd.; Mitsubishi Chemical Industries Limited, both of Tokyo, Japan

[21] Appl. No.: 359,513

[22] Filed: Mar. 18, 1982

[30] Foreign Application Priority Data

Mar. 20, 1981 [JP] Japan ................................ 56-39336

[51] Int. Cl.³ .......................... C09K 3/34; G02F 1/13; C09B 1/22
[52] U.S. Cl. ................................ 350/349; 252/299.1; 260/377
[58] Field of Search ................. 260/377; 252/299.1; 350/349

[56] References Cited

U.S. PATENT DOCUMENTS

| | | | |
|---|---|---|---|
| 4,032,219 | 6/1977 | Comstamt et al. | 252/299.1 |
| 4,145,114 | 3/1979 | Coates et al. | 252/299.1 |
| 4,181,668 | 1/1980 | Elser et al. | 252/299.1 |
| 4,360,447 | 11/1982 | Morimaka et al. | 252/299.1 |
| 4,363,743 | 12/1982 | Moeller et al. | 252/299.1 |
| 4,376,715 | 3/1983 | Cognard et al. | 252/299.1 |
| 4,395,350 | 7/1983 | Boller et al. | 252/299.1 |

FOREIGN PATENT DOCUMENTS

| | | | |
|---|---|---|---|
| 26004 | 4/1981 | European Pat. Off. | 252/299.1 |
| 38460 | 10/1981 | European Pat. Off. | 252/299.1 |
| 3038372 | 5/1981 | Fed. Rep. of Germany | 252/299.1 |
| 55-127485 | 10/1980 | Japan | 252/299.1 |
| 56-57850 | 5/1981 | Japan | 252/299.1 |
| 57-49686 | 3/1982 | Japan | 252/299.1 |
| 2010306 | 6/1979 | United Kingdom | 252/299.1 |
| 2037803 | 7/1980 | United Kingdom | 252/299.1 |
| 2074182 | 10/1981 | United Kingdom | 252/299.1 |

OTHER PUBLICATIONS

Seki, H., et al., Jpn. J. Appl. Phys., vol. 21, No. 1, pp. 191–192, (Jan. 1982).

Seki, H., et al., Abst L-1P, 8th Int. Liq. Cryst. Conf. Abstracts, Kyoto, Japan, (1980).

*Primary Examiner*—Teddy S. Gron
*Attorney, Agent, or Firm*—Antonelli, Terry & Wands

[57] ABSTRACT

The present liquid crystal composition is characterized by containing a dye of anthraquinone series represented by the following general formula (1) dissolved as a guest in a host liquid crystal:

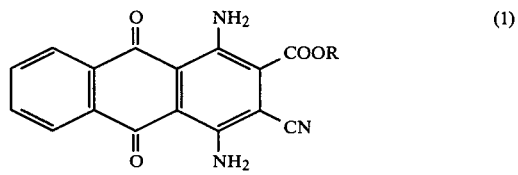

wherein R represents an alkyl group or a cycloalkyl group. The alkyl group or the cycloalkyl group of the dye of anthraquinone series includes those substituted by alkyl, hydroxyl, alkoxy, cycloalkyl, aryl, aryloxy, dialkylamino, or heterocyclic residue. Furthermore, the liquid crystal composition can contain two or more other kinds of the dye of anthraquinone series, or can be used in combination with other dyes. In the dye of anthraquinone series, the group —COOR at the 2-position and the group —CN at the 3-position are particularly important for realization of cyan color and a high S value.

The dye of anthraquinone series is particularly effective for preparation of a black dye.

The present liquid crystal display device is characterized by comprising a liquid crystal cell comprising two transparent juxtaposed substrate plates, transparent electrodes formed each on the opposite inner surfaces of the substrate plates, alignment films formed each on the opposite inner surfaces of the substrate plates to cover the transparent electrodes and align liquid crystal molecules, sealing members for keeping the two substrate plates at a predetermined distance, a liquid crystal composition containing the dye represented by the said general formula (1) being filled in the liquid crystal cell, and a light source being provided outside the liquid crystal cell.

15 Claims, 8 Drawing Figures

GUEST-HOST TYPE LIQUID CRYSTAL COMPOSITION AND LIQUID CRYSTAL DISPLAY DEVICE

This invention relates to a guest-host type liquid crystal composition containing a pleochroic dye dissolved as a guest in a host liquid crystal, and to a color liquid display device in which said composition is sealed.

The guest-host type liquid crystal composition contains a pleochroic dye as a guest in a host liquid crystal, and such a dye must have a high order parameter "S" (which will be hereinafter referred to as "S value") in a host liquid crystal. The S value represents the power of orientation of the dye by the molecules of the liquid crystal for a display with a strong contrast to be obtained, and can be obtained by using the following equation:

$$S = \tfrac{1}{2}(3\cos^2\theta - 1) \quad (I)$$

$$S = \frac{A_\parallel - A_\perp}{2A_\perp + A_\parallel} \quad (II)$$

wherein $A_\parallel$ and $A_\perp$ represent the absorbances of the dye molecules to the lights polarized parallel to and perpendicular to the orientational direction of the host liquid crystal, respectively. Therefore, if $A_\parallel$ and $A_\perp$ are obtained by measuring absorption spectra, the order parameter of the dye in the host liquid crystal can be obtained, and the orientation of the dye can be evaluated. In the case of pleochroic dyes having parallel dichroism, when the S value comes closer to 1, the contrast of the display device can be improved.

No disclosure has been made yet of a liquid crystal composition containing pleochroic dye having a relatively high S value and showing a cyan color in a host liquid crystal.

An object of the present invention is to provide a guest-host type liquid crystal composition containing a pleochroic dye having parallel dichroism showing a cyan color and capable of making clear display of clear contrast when sealed into a device, and also to provide a transmission type liquid crystal display device containing the said composition.

The present liquid crystal composition is characterized by containing a dye of anthraquinone series represented by the following general formula (1) in a host liquid crystal:

wherein R represents an alkyl group or a cycloalkyl group. The alkyl group or the cycloalkyl group of the dye of anthraquinone series includes those substituted by alkyl, hydroxyl, alkoxy, cycloalkyl, aryl, aryloxy, dialkylamino, or heterocyclic residue. Furthermore, the liquid crystal composition can contain two or more other kinds of the dye of anthraquinone series, or can be used in combination with other dyes. In the dye of anthraquinone series, the group —COOR at the 2-position and the group —CN at the 3-position are particularly important for realization of cyan color and a high S value.

The dye of anthraquinone series represented by the said general formula (1) is particularly effective for preparation of a black pigment, because the cyan color of the dye of anthraquinone series can absorb the light around 700 nm. For example, when a blue dye capable of absorbing the light around 600 nm, a red dye capable of absorbing the light around 550 nm and a yellow dye capable of absorbing the light around 450 nm are mixed with the present dye of cyan color represented by the said general formula (1), a black dye capable of absorbing the entire range of visible light of about 400 to about 700 nm can be obtained. When such black dye is used in a transmission type liquid crystal display device, a device with an excellent light shield effect (black display parts failing to transmit light) can be obtained.

A blue pigment to be used together for preparation of black dye is desirably a dye of anthraquinone series represented by the general formula (2):

to obtain a device of clear contrast, where X represents oxygen atom, sulfur atom or group —NR'—, where R' shows hydrogen atom or lower alkyl group, and Ar is aryl or substituted aryl group.

Examples of R of said general formula (1) include an alkyl group, such as methyl, ethyl, straight or branched alkyl groups having 1 to 18 carbon atoms, and substituted alkyl groups where the above-mentioned alkyl groups have a substituent or substituents, and cycloalkyl groups such as cyclohexyl, 4-methylcyclohexyl, 4-ethylcyclohexyl, 4-n-propylcyclohexyl, 4-n-butylcyclohexyl, 4-cyclohexylcyclohexyl, 4-n-butylcyclohexyl, 4-n-octylcyclohexyl, 4-n-nonylcyclohexyl, 4-methoxycyclohexyl, 4-butoxycyclohexyl, and 4-octyloxycyclohexyl.

The substituents for Ar of said general formula (2) include, for example, alkyl, alkoxy, cycloalkyl, aryl, hydroxy, acyloxy, acylamino, sulfonyloxy, sulfoneamido, carboxylic acid ester group, carbamoyl, sulfonic acid ester group, sulfamoyl, dialkylamino, halogen atom, nitro, and cyano.

A nematic liquid crystal is used in the present invention upon selection in a considerably wide range, so far as it can show a nematic state in the working temperature range. The nematic liquid crystal can be admixed with an optically active compound to obtain a cholesteric state. Examples of the nematic liquid crystal includes compounds shown in Table 1 or their derivatives.

TABLE 1

| No. | Series | Example |
|---|---|---|
| 1 | cyclohexylcyclohexane series | $R^2$—[H]—[H]—$X^1$ |
| 2 | phenylcyclohexane | $R^2$—[H]—[phenyl]—$X^1$ |
| 3 | biphenyl series | $R^2$—[phenyl]—[phenyl]—$X^1$ |
| 5 | terphenyl series | $R^2$—[phenyl]—[phenyl]—[phenyl]—$X^1$ |
| 5 | cyclohexylcyclohexanoate series | $R^2$—[H]—COO—[H]—$X^1$ |
| 6 | phenylcyclohexyl carboxylate series | $R^2$—[H]—COO—[phenyl]—$X^1$ |
| 7 | ester series | $R^2$—[phenyl]—COO—[phenyl]—$X^1$ |
| 8 | diester series | $R^2$—[phenyl]—COO—[phenyl]—COO—[phenyl]—$X^1$ <br> $X^1$—[phenyl]—COO—[phenyl]—COO—[phenyl]—$R^2$ |
| 9 | biphenylcyclohexyl carboxylate series | $R^2$—[H]—COO—[phenyl]—[phenyl]—$X^1$ |
| 10 | biphenyl ester series | $R^2$—[phenyl]—[phenyl]—COO—[phenyl]—$X^1$ <br> $X^1$—[phenyl]—[phenyl]—COO—[phenyl]—$R^2$ |
| 11 | thioester series | $R^2$—[phenyl]—COS—[phenyl]—$X^1$ |

TABLE 1-continued

| No. | Series | Example |
|---|---|---|
| 12 | Schiff series | R²—⟨⟩—CH=N—⟨⟩—X¹ |
|  |  | X¹—⟨⟩—CH=N—⟨⟩—R² |
| 13 | pyrimidine series | R²—⟨⟩—⟨N=/=N⟩—X¹ |
|  |  | R²—⟨N=/=N⟩—⟨⟩—X¹ |
|  |  | R²—⟨⟩—⟨N=/=N⟩—X¹ |
|  |  | R²—⟨N=/=N⟩—⟨⟩—X¹ |
| 14 | dioxane series | R²—⟨O—O⟩—⟨⟩—X¹ |
| 15 | cyclohexylmethyl ester series | R²—⟨H⟩—CH₂O—⟨⟩—X¹ |
|  |  | R²—⟨H⟩—CH₂O—⟨⟩—⟨⟩—X¹ |
| 16 | cinnamonitrile series | R²—⟨H⟩—⟨⟩—CH=CH—X¹ |

In Table 1, $R^2$ represents alkyl or alkoxy, and $X^1$ represents nitro, cyano, or halogen atom.

All of the liquid crystals shown in Table 1 have a positive dielectric anisotropy, and the well known liquid crystals having a negative dielectric anisotropy, such as ester series, azoxy series, azo series, Schiff series, pyrimidine series, diester series or biphenyl ester series can be used by mixing with a liquid crystal having a positive dielectric anisotropy to produce a liquid crystal mixture having a positive dielectric anisotropy on the whole. Even a liquid crystal having a negative dielectric anisotropy can be, of course, used directly by using a suitable device constitution and driving method.

The host liquid crystal compound for use in the present invention is any liquid compound shown in Table 1 or a mixture thereof, and it has been found particularly useful for the present invention to use a liquid crystal mixture commercial available from Merck Co., USA, under the trademark ZLI-1132, consisting of the following 4 kinds of liquid crystal compounds:

38.4 wt. % $C_3H_7$—⟨H⟩—⟨⟩—CN,

34.2 wt. % $C_5H_{11}$—⟨H⟩—⟨⟩—CN,

18.1 wt. % $C_7H_{15}$—⟨H⟩—⟨⟩—CN, and

9.3 wt. % C$_5$H$_{11}$CN, and also a liquid crystal mixture commercially available from British Drug House under the trademark E-7, consisting of the following 4 kinds of liquid crystal compounds:

51 wt. % C$_5$H$_{11}$CN, 25 wt. % C$_7$H$_{13}$CN, 16 wt. % C$_8$H$_{17}$OCN, and 8 wt. % C$_5$H$_{11}$CN.

The optically active substance for use in the present liquid crystal composition includes chiral nematic compounds, for example, nematic liquid crystal compounds having such optically active groups such as 2-methylbutyl, 3-methylbutoxy, 3-methylpentyl, 3-methylpentoxy, 4-methylhexyl, 4-methylhexytoxy, etc. Furthermore, other optically active substances such as alcohol derivatives, for example, l-menthol, d-borneol, and the like, ketone derivatives, such as d-camphor, 3-methylcyclohexane, and the like, carboxylic acid derivatives, such as d-citronellic acid, l-camphoric acid, and the like, aldehyde derivatives such as d-citronellal, and the like, alkene derivatives such as d-linonene, and the like, and amine, amide and nitrile derivatives can be, of course, used.

The present liquid crystal display device comprises a liquid crystal cell comprising two transparent juxtaposed substrate plates, transparent electrodes formed each on the opposite inner surfacs of the substrate plates, alignment films formed each on the opposite inner surfaces of the substrate plates to cover the transparent electrodes and align liquid crystal molecules, sealing members for keeping the two substrate plates at a predetermined distance, a liquid crystal composition containing the dye represented by the said general formula (1) being filled in the liquid crystal cell, and a light source being provided outside the liquid crystal cell.

Usually, a liquid crystal display device having two glass substrate plates juxtaposed by an appropriate spacer is used, where the gap of the device depends upon the spacer. Practically preferable gap is 3–100 nm, particularly 5–50 μm.

Examples of pleochroic dyes having parallel dichroism for use in the present liquid crystal composition, liquid crystal compositions and liquid crystal display devices using these dyes will be described in detail below, referring to Examples.

EXAMPLE 1

Examples of pleochroic dyes having parallel dichroism for use in the present liquid crystal composition, which are represented by the general formula (1), are given in Table 2, together with their maximum absorption wavelength λ and order parameter S.

TABLE 2

| No. | —R | λ (nm) | S |
|---|---|---|---|
| 1 | —CH$_3$ | 660 | 0.68 |
| 2 | —C$_2$H$_5$ | 659 | 0.68 |
| 3 | —C$_3$H$_7$(n) | 660 | 0.67 |
| 4 | —C$_4$H$_9$(n) | 658 | 0.66 |
| 5 | —CH(CH$_3$)(C$_2$H$_4$) | 660 | 0.6 |
| 6 | —C$_6$H$_{13}$(n) | 660 | 0.66 |
| 7 | —C$_8$H$_{17}$(n) | 660 | 0.67 |
| 8 | —CH$_2$—CH(C$_2$H$_5$)(C$_4$H$_9$(n)) | 659 | 0.63 |
| 9 | —C$_{12}$H$_{25}$(n) | 658 | 0.66 |
| 10 | —C$_{18}$H$_{37}$(n) | 660 | 0.63 |
| 11 | —(H) | 659 | 0.70 |
| 12 | —(H)—C$_4$H$_9$(n) | 658 | 0.71 |
| 13 | —(H)—C$_7$H$_{15}$(n) | 660 | 0.71 |
| 14 | —(H)—C$_9$H$_{19}$(n) | 658 | 0.72 |
| 15 | —(H)—OC$_4$H$_9$(n) | 660 | 0.74 |

TABLE 2-continued

| No. | —R | λ (nm) | S |
|---|---|---|---|
| 16 | —⟨H⟩—⟨H⟩ (bicyclohexyl) | 660 | 0.73 |
| 17 | —CH$_2$—⟨phenyl⟩ | 660 | 0.63 |
| 18 | —C$_2$H$_4$—⟨phenyl⟩ | 659 | 0.64 |
| 19 | —C$_2$H$_4$—⟨H⟩ (cyclohexyl) | 659 | 0.65 |
| 20 | —C$_2$H$_4$OC$_2$H$_5$ | 660 | 0.65 |
| 21 | —C$_2$H$_4$OC$_4$H$_9$(n) | 661 | 0.66 |
| 22 | —C$_2$H$_4$OH | 660 | 0.66 |
| 23 | —C$_2$H$_4$N(CH$_3$)$_2$ | 660 | 0.61 |
| 24 | —C$_2$H$_4$—O—⟨phenyl⟩ | 660 | 0.64 |
| 25 | —CH$_2$—⟨furyl, O⟩ | 658 | 0.62 |
| 26 | —CH$_2$—⟨tetrahydrofuryl, H, O⟩ | 658 | 0.64 |
| 27 | —CH$_2$—⟨pyridyl, N⟩ | 660 | 0.60 |

The characteristics of the respective dyes shown in Table 2 were investigated in the following manner. Said liquid crystal mixture ZLI-1132 of phenylcyclohexane series was admixed with one of the dyes shown in Table 2 as a pleochroic dye, heated at 70° C. or higher to change the liquid crystal into an isotropic liquid, and then well mixed in the isotropic state, and then left standing for cooling. The dye was completely dissolved by repetition of the foregoing steps.

The thus prepared liquid crystal composition was sealed into a liquid crystal display cell having a gap distance of 10-100 nm between two horizontally juxtaposed glass substrate plates each having a transparent electrode on their inner surface, a homogeneous alignment treatment being applied to the surface in contact with a liquid crystal by applying polyamide resin thereto, followed by curing and rubbing. The liquid crystal composition took a homogeneous alignment state as shown in FIG. 1 in the cell having the said alignment treatment under no application of voltage, and also the dye molecules took the same alignment in accordance with that of the host liquid crystal molecules.

Figure 1:
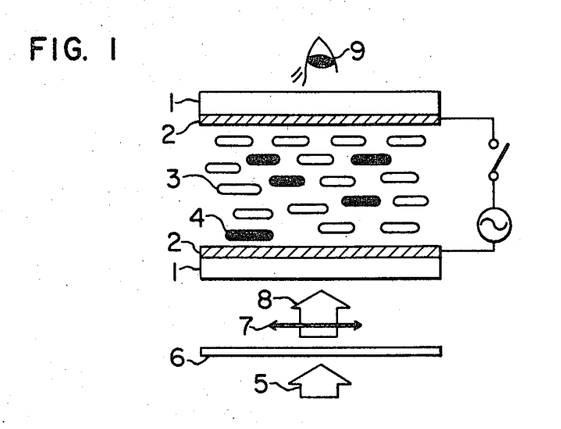
FIG. 1 is a schematic cross-sectional view showing a state of one embodiment of the present liquid crystal display device under no application of voltage.

The structure of the liquid crystal display device shown in FIG. 1 is well known, except for the liquid crystal compositions of Example 1 sealed in the cell. That is, the liquid crystal display device comprises two horizontally juxtaposed transparent glass substrate plates 1, transparent electrodes 2 each formed on the opposite inner surfaces of the substrate plates, and a liquid crystal composition comprising liquid crystal molecules 3 and pleochroic dye molecules 4 provided between the substrate plates. Incoming natural light 5 is polarized by polarizing plate 6 parallel to the alignment direction of liquid crystal 7 and reaches the device as incoming white polarized light 8. Numeral 9 is an observer's eyes.

Absorption spectra of the liquid crystal compositions of Example 1 were determined by using light polarized parallel to the alignment direction of liquid crystal and light polarized perpendicularly to the alignment direction of liquid crystal, that is, by measuring absorbances $A \parallel$ and $A \perp$ and maximum absorption wavelength of a given dye by the respective polarized lights. In the measurement of absorbances by the dye, correction was made to the absorption by host liquid crystal and glass substrate plate and reflection loss of the device. From the absorbances $A \parallel$ and $A \perp$ of a given dye by the respective polarized lights were calculated the value S by using the said formula (II).

EXAMPLE 2

Figure 2:
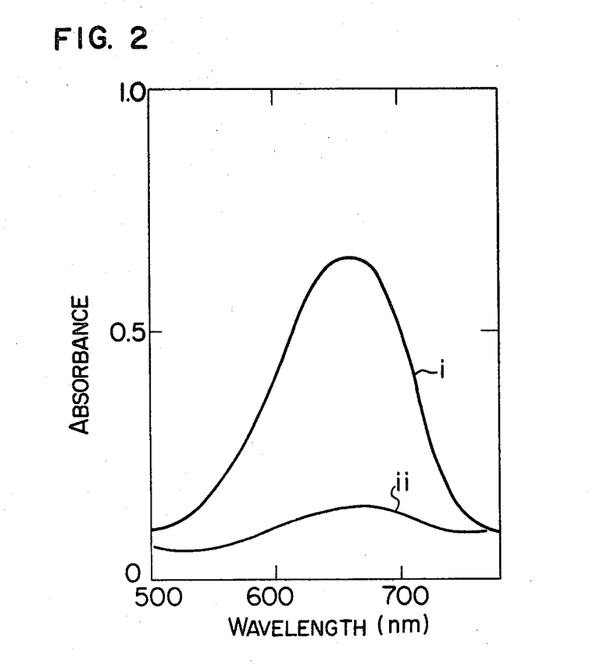
FIGS. 2–4 show spectroscopic characteristics of embodiments of the present liquid crystal display device.

The same liquid crystal mixture as used in Example 1, which contained 1.04% by weight of dye No. 7 of Table 2, was sealed into the same device as used in Example 1, and subjected to measurement of absorption spectra in the same manner as in Example 1, where the gap between the substrate plates was made to be about 10 μm distant. The absorption spectra of the liquid crystal composition of Example 2 is shown in FIG. 2, where curve i and curve ii show $A \parallel$ and $A \perp$, respectively. The maximum absorption wavelength in the visible region was 660 nm, and $A \parallel$ at the maximum absorption wavelength was 0.596, and $A \perp$ was 0.085. Thus, the S value of the dye of Example 2 was 0.67.

EXAMPLE 3

Figure 3:
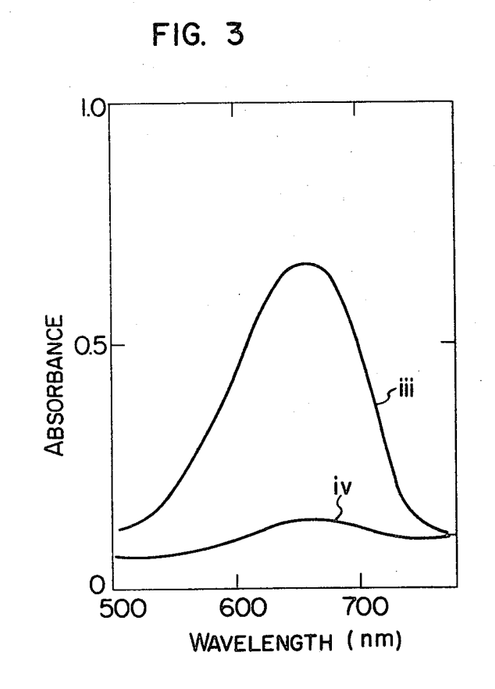

The same liquid crystal mixture as used in Example 1, which contained 1.18% by weight of the dye No. 12 of Table 2, was sealed in the same device as used in Example 2, and subjected to measurement of absorption spectra in the same manner as in Example 1 and 2. The absorption spectra of the liquid crystal composition of Example 3 is shown in FIG. 3, where curve iii and curve iv show $A \parallel$, and $A \perp$, respectively. The maximum absorption wavelength in the visible region was 658 nm, and $A \parallel$ at the maximum absorption wavelength was 0.604, and $A \perp$ 0.073. Thus, the S value of the dye of Example 3 was 0.71.

EXAMPLE 4

Figure 4:
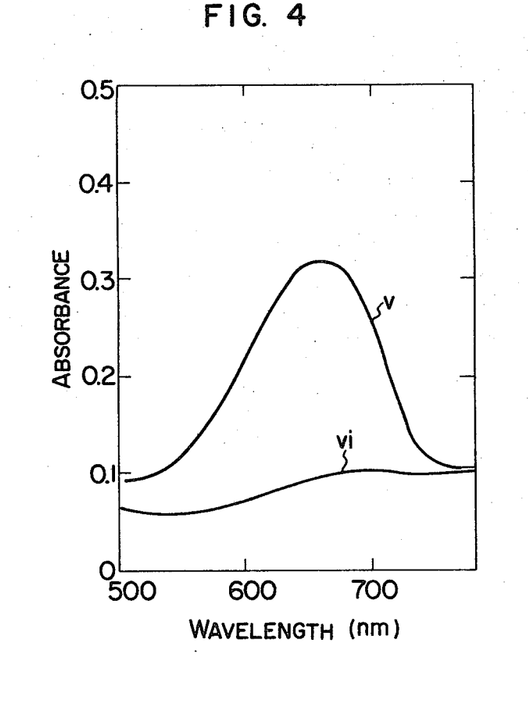

The same liquid crystal mixture as used in Example 1, which was saturated with the dye No. 16 of Table 2, was sealed into the same device as used in Examples 2 and 3, and subjected to measurement of absorption spectra in the same manner as in Examples 1-3. The absorption spectra of the liquid crystal composition of Example 4 is shown in FIG. 4, where curve v and curve vi show A∥ and A⊥, respectively. The maximum absorption wavelength in the visible region was 660 nm and A∥ at the maximum absorption wavelength was 0.253, and A⊥ 0.028. The S value of the dye of Example 4 was 0.73.

EXAMPLE 5

The same liquid crystal mixture ZLI-1132 of phenylcyclohexane series as used in Example 1 was admixed with 7.5% by weight of 4-(2-methylbutyl)-4'-cyanobiphenyl made by British Drug House, 2.0% by weight of yellow dye of quinophthalone series of the following formula and 2.5% by weight of the dye No. 12 of Table 2, the mixture, heated at 70° C. or higher, was well stirred in a liquid isotropic state, and was then left standing for cooling. The foregoing steps were repeated to dissolve the added two dyes.

Figure 5:
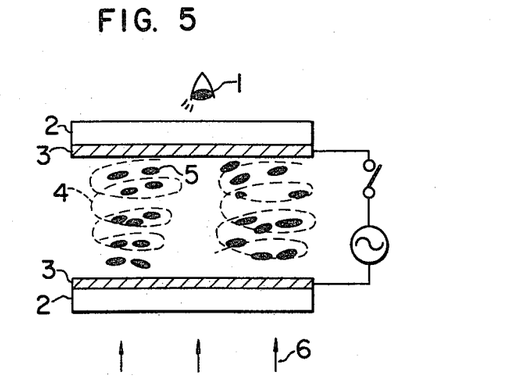
FIG. 5 is another schematic cross-sectional view showing a state of another embodiment of the present liquid crystal display device under no application of voltage.
Figure 6:
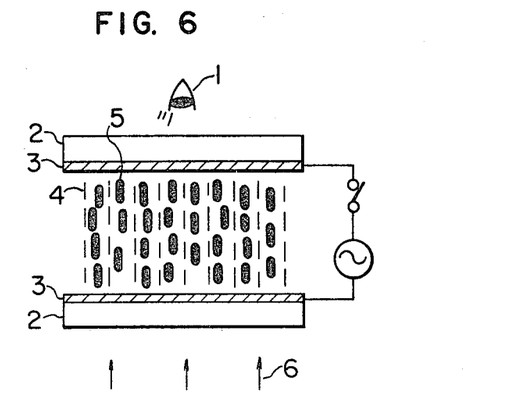
FIG. 6 is a schematic cross-sectional view of a state of one embodiment of the present liquid crystal display device.
Figure 7:
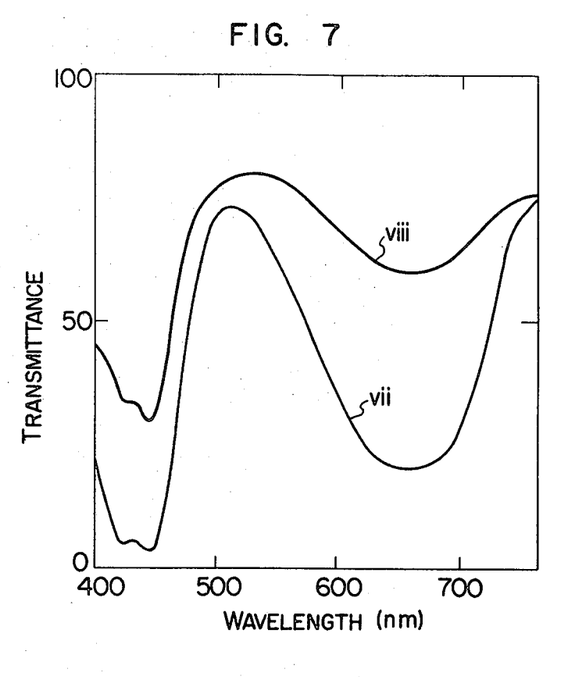
FIG. 7 shows spectroscopic characteristics of another embodiment of the present liquid crystal display device.

The thus prepared liquid crystal composition was sealed into the same device as used in Examples 2-4. The liquid crystal molecules and dye molecules took a cholesteric state called Grandjean state as shown in FIG. 5 under no application of electric field, and the device was dark green. In FIG. 5 the same reference numerals as in FIG. 1 show the same members. When an alternating current voltage of 30 V, 50 Hz was applied to the device, the liquid crystal molecules and dye molecules took a homeotropic alignment as shown in FIG. 6, and the device was light green. In FIG. 6, the same reference mumerals as in FIG. 1 show the same members. Spectroscopic characteristics of the device according to Example 5 are shown in FIG. 7, where curve vii shows absorption spectra under no application of voltage, and curve viii absorption spectra under application of voltage.

As described in the present Example the present liquid crystal composition can realize any hue by mixing the dye of cyan color represented by said formula (1) with yellow dye or magenta dye.

EXAMPLE 6

To investigate the practical reliability of the guest dyes for use in the present liquid crystal composition, an accelerated weathering test was carried out.

The respective liquid crystal display devices prepared in Examples 2-4 were left standing in a sunshine weathermeter for about 100 hours to investigate reduction ratio of absorbance. For comparison, so far well known typical dyes were likewise prepared into liquid crystal display devices and subjected to the accelerated weathering test. The light source of the sunshine weathermeter used for the present Example was a carbon arc lamp, and the conditions for the test chamber were a temperature of about 50° C. and a relative humidity of about 90%. The weathering test was conducted while protecting the devices through an ultraviolet light cut filter.

Figure 8:
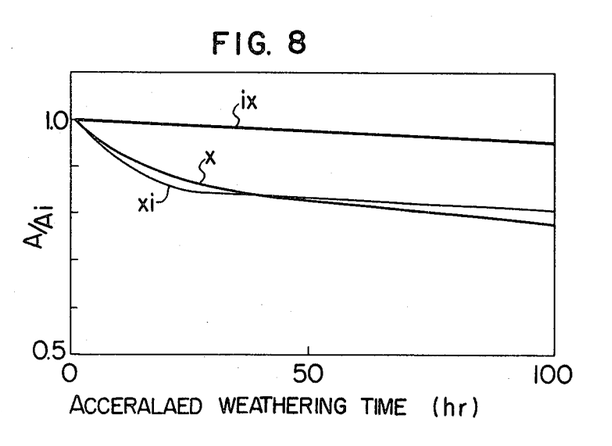
FIG. 8 is a characteristic diagram showing changes in absorbance with time between one embodiment of the present liquid crystal display device and a comparative liquid crystal display device.

The results of the accelerated weathering test by the weathermeter are shown in FIG. 8, where the axis of ordinate shows a ratio of absortance A at the respective time to the initial absorbance Ai, i.e. A/Ai, the axis of abscissa shows accelerated weathering time, curve ix shows changes in absorbance of the devices containing the dyes used in Examples 2-4, curve x shows that of the following azo dye:

and curve xi shows that of the following azo dye:

When the liquid crystal display device prepared in Example 2 was left standing in the weathermeter under application of an alternating current voltage of 5 V, 32 Hz for about 100 hours, the consumed current amounted to 0.60 μA about 100 hours after the start of the test in contrast to the initial current of 0.54 μA, and the increment was very small.

The present liquid crystal compositions are more stable against heat, light and current than the liquid crystal compositions containing the conventional dichroic dyes.

EXAMPLE 7

The same host liquid crystal mixture as used in Example 1 was admixed with guest dyes shown in Table 3, among which dye A was a dye corresponding to the dye No. 12 of Table 2, dye B was a blue dye of anthraquinone series capable of absorbing light around 600 nm, dye C was a red dye of azo series capable of absorbing light around 550 nm, and dye D was a yellow dye of azo series capable of absorbing light around 450 nm.

TABLE 3

TABLE 3-continued

Dye B    3.0 wt %

(anthraquinone with 1,4-diamino and 2-COO-C6H4-C4H9(n) substituents)

Dye C    1.5 wt %

(n)H9C4—C6H4—N=N—(naphthalene)—N=N—C6H4—N(CH3)2

Dye D    1.3 wt %

(n)H9C4—C6H4—N=N—(naphthalene)—N=N—C6H4—OC2H5

The resulting liquid crystal composition was sealed into the same device as used in Example 1, except that the gap between the substrate plates was about 10 μm distant. A polarizing plate HN-38, made by Polaroid Co., USA, was arranged against the thus prepared liquid crystal display device, as shown in FIG. 1, so that the polarizing axis of the polarizing plate can be in parallel to the alignment direction of liquid crystal of the liquid crystal display device, and light was made to hit the device from the back side. The device showed black state of very low light transmittance, when viewed from the face side, under no application of voltage.

When an alternating current voltage of 10 V, 32 Hz was applied to the device, the device showed a white-through state of light transmission only at the voltage-applied parts of the device, thus realizing a transmission-type display of very clear contrast. Even when a reddish tungsten lamp was used as the backside light source in the device of the present Example, the red light component of wavelength around 700 nm was absorbed by the dye A, and thus a better display of making the red component of the light source negligible was obtained.

Thus, the present pleochroic dye of cyan color is very useful for realizing a better display quality of a black transmission-type guest-host liquid crystal display device.

According to the present invention, clear color display of good contrast can be obtained in a liquid crystal display device by sealing into the device a liquid crystal composition containing a dye satisfying the requirements for pleochroic dye having parallel dichroism and showing a cyan color.

We claim:

1. A guest-host type liquid crystal composition containing a pleochroic dye dissolved as a guest in a host liquid crystal, which comprises the pleochroic dye being at least one of dyes of anthraquinone series, represented by the following general formula (1);

(1)

wherein R is an alkyl group having 1 to 18 carbon atoms or a cyclohexyl group, which alkyl group can be substituted by hydroxyl group, alkoxy group, cyclohexyl group, phenyl group, phenyloxy group, dialkylamino group, and which cyclohexyl group can be substituted at the para-position by an alkyl group, an alkoxy group or a cyclohexyl group.

2. The guest-host type liquid crystal composition according to claim 1, wherein the pleochroic dye is a black dye mixture, for absorbing an entire range of visible light, comprising the dye of anthraquinone series represented by the general formula (1) and at least one other pleochroic dye.

3. The guest-host type liquid crystal composition according to claim 2, wherein the at least one other pleochroic dye is a blue dye, a red dye and a yellow dye.

4. The guest-host type liquid crystal composition according to claim 3, wherein the blue dye is a dye of anthraquinone series, and the red dye and the yellow dye are dyes of at least one of azo series and quinophthalone series.

5. The quest-host type liquid crystal composition according to claim 4, wherein the blue dye of anthraquinone series is represented by the following formula (2):

wherein X represents a oxygen atom, a sulfur atom, or a group —NR'—, where R' represents a hydrogen atom or a lower alkyl group, and Ar represents an aryl group or a substituted aryl group.

6. A guest-host type liquid crystal composition containing a pleochroic dye dissolved as a guest in a host liquid crystal, which comprises the pleochroic dye being a black dye mixture, for absorbing an entire range of visible light, comprising at least one of dyes of anthraquinone series, represented by the following general formula (1):

wherein R is an alkyl group of 1-18 carbon atoms or a cyclohexyl group, which alkyl group can be substituted by hydroxyl group, alkoxy group, cyclohexyl group, phenyl group, phenyloxy group, dialkylamino group, and which cyclohexyl group can be substituted at the para-position by an alkyl group, an alkoxy group or a cyclohexyl group; at least one of dyes of anthraquinone series represented by the following general formula (2):

wherein X represents an oxygen atom, a sulfur atom, or a group —NR¹—, where R¹ represents a hydrogen atom or a lower alkyl group, and Ar represents an aryl group or a substituted aryl group; and at least one other pleochroic dye.

7. The guest-host type liquid crystal composition according to claim 6, wherein the R of the general formula (1) is the XR¹ of the general formula (2) is and said at least one other pleochroic dye is a mixture of compounds of the following formulae (3) and (4):

and

8. In a transmission-type, liquid crystal display device comprising a liquid crystal cell comprising two transparent juxtaposed substrate plates, transparent electrodes formed each on the opposite inner surfaces of the substrate plates, alignment films formed each on the opposite inner surfaces of the substrate plates, thereby to cover the transparent electrodes and align liquid crystal molecules, sealing members for keeping the two substrate plates at a predetermined distance, a liquid crystal being filled in the liquid crystal cell, the liquid crystal composition being a guest-host type liquid crystal composition containing a pleochroic dye dissolved as a guest in a host liquid crystal and a light source being provided outside the liquid crystal cell, an improvement which comprises the pleochroic dye being at least one of dyes of anthraquinone series, represented by the following general formula (1):

wherein R is an alkyl group of 1-18 carbon atoms or a cyclohexyl group, which alkyl group can be substituted by hydroxyl group, alkoxy group, cyclohexyl group, phenyl group, phenyloxy group, dialkylamino group, and which cyclohexyl group can be substituted at the para-position by an alkyl group, an alkoxy group or a cyclohexyl group.

9. The transmission type liquid crystal display device according to claim 8, wherein the pleochroic dye is a black dye mixture, for absorbing an entire range of visible light, comprising the dye of anthraquinone series represented by the general formula (1) and at least one other pleochroic dye.

10. The guest-host type liquid crystal composition according to claim 1, wherein the cyclohexyl group can be substituted at the para-position by an alkyl group having 1 to 9 carbon atoms, an alkoxy group having 1 to 8 carbon atoms, or a cyclohexyl group.

11. The tranmission type liquid crystal display device according to claim 8, wherein the cyclohexyl group can be substituted at the para-position by an alkyl group having 1 to 9 carbon atoms, an alkoxy group having 1 to 8 carbon atoms, or a cyclohexyl group.

12. The guest-host type liquid crystal composition according to claim 5, wherein the substituent of the substituted aryl group is selected from the group consisting of alkyl, alkoxy, cycloalkyl, aryl, hydroxy, acyloxy, acylamino, sulfonyloxy, sulfoneamido, carboxylic acid ester, carbamoyl, sulfonic acid ester, sulfamoyl, dialkylamino, halogen atom, nitro and cyano.

13. The guest-host type liquid crystal composition according to claim 12, wherein the aryl or substituted aryl group is a phenyl or substituted phenyl group.

14. The guest-host type liquid crystal composition according to claim 6, wherein the substituent of the substituted aryl group is selected from the group consisting of alkyl, alkoxy, cycloalkyl, aryl, hydroxy, acyloxy, acylamino, sulfonyloxy, sulfoneamido, carboxylic acid ester, carbamoyl, sulfonic acid ester, sulfamoyl, dialkylamino, halogen atom, nitro and cyano.

15. The guest-host type liquid crystal composition according to claim 14, wherein the aryl or substituted aryl group is a phenyl or substituted phenyl group.

* * * * *